June 24, 1941.   T. B. PATCH   2,247,159
ELECTRIC BRAKE
Filed March 27, 1941
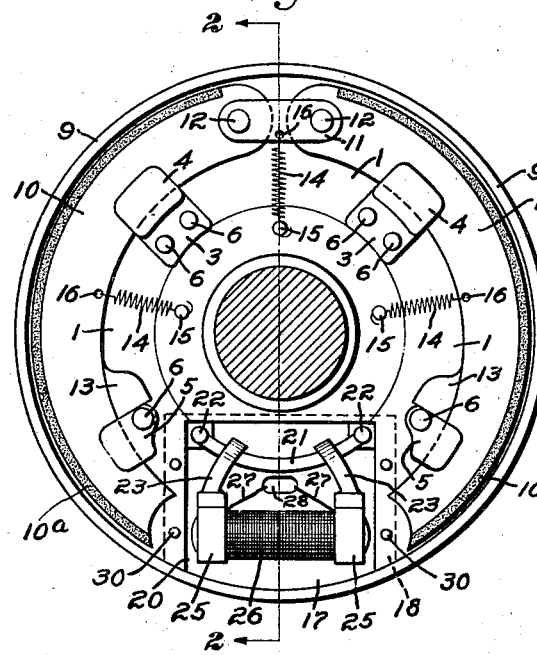
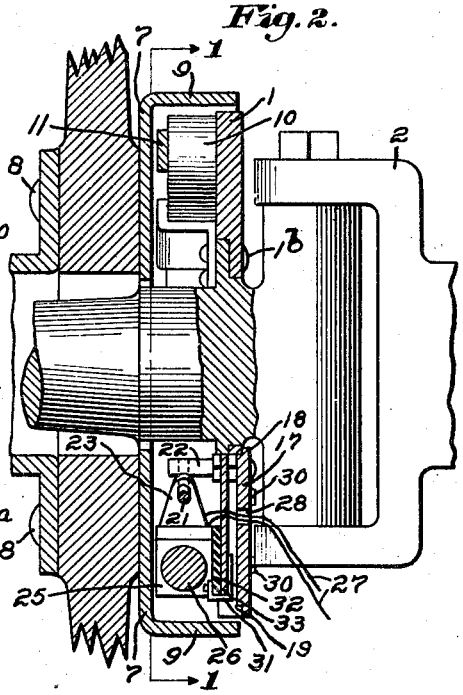
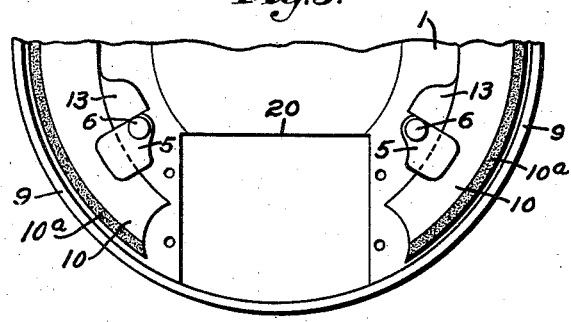
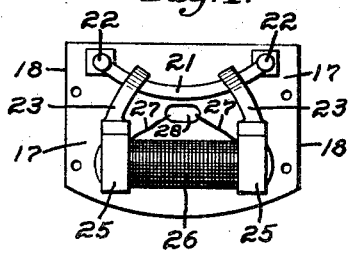
Inventor:
Theodore B. Patch, Patented June 24, 1941

2,247,159

UNITED STATES PATENT OFFICE 2,247,159

ELECTRIC BRAKE

Theodore B. Patch, Boston, Mass.

Application March 27, 1941, Serial No. 385,434

4 Claims. (Cl. 188—138)

This invention relates to brakes for vehicles and especially automobiles and is directed to electrically operated brakes, and the invention aims to provide an improved and novel form of construction therefor over that shown in my prior Patent No. 1,546,864, and is particularly adapted for use upon automobile trailers.

In the drawing of the embodiment of my invention selected for illustration and description herein:

Fig. 1 is a view of the inner face of the shoe plate or cover of a conventional brake drum with the brake shoes thereon, on the line 1—1, Fig. 2;

Fig. 2 is a vertical section through the same elements on the line 2—2, Fig. 1, from the right, and mounted for convenience on a conventional steering knuckle for a vehicle front wheel, partly broken away;

Fig. 3, a partial view like Fig. 1, showing the wall panel carrying the electro-magnet assembly of the brake removed; and Fig. 4, an inner face of the panel after removal.

Referring first to Fig. 1, my novel brake construction comprises the usual shoe carrying supporting plate or cover of the brake assembly as a support, herein shown as a ring-like member 1 secured by bolts 1b to the steering knuckle 2 of the front wheel of a vehicle and having therein angular clips or brackets 3, with offset shoe guiding flanges 4, and similar, but smaller, brackets 5, both of which may be secured to the plate 1 as by bolts 6, those used on the clips 5 being larger than those on the clips 4 and serving as anchor pins or fixed stops for the shoes to be described. The drum 7 of iron or other suitable magnetic material is of the desired size and secured to the wheel by bolts 8, and with the usual inturned flange 9 against which the brake shoes act.

On the plate 1 and resting in the angular brackets 3 are one or more shoes 10, preferably at least two, of suitable size and material, as iron or steel and the like, with suitable linings 10a, the two adjacent ends of the shoes being flexibly secured, as by a clip 11 and bolts 12, to insure more ready and positive cooperation of them with the inner wall of the drum flange 9 throughout a large area.

The free ends of the shoes 10 have lugs 13 cooperating with and normally resting against the anchor pins 6, and said shoe ends are preferably cupped slightly to insure proper contact and directed cooperation with the electro-magnet ends to be described.

The shoes 10 are each provided with springs 14, one end of which is secured to a pin 15 on the plate 1, while the opposite end engages an aperture 16 in the shoe 10 and thus maintains the spring under slight tension to assist in returning the shoe 10 to normal position when released from contact with the drum flange 9.

Heretofore in brakes of this type it has been necessary, when it was desired to have access to the electro-magnet or other portion of the brake actuating assembly, usually and preferably largely of brass or other non-magnetic material, for repair, to remove the wheel in order to get at the assembly. This was a great inconvenience and necessitated much work and time, and has, in the present instance, been avoided by the provision of a removable panel in the support.

Herein the plate 1, Figs. 1, 2, 3, is provided at any convenient place with a removable plate or panel 17 with an overlapping flange 18 resting against a cooperating flange 19 on the edge of an opening 20 in the plate 1, Fig. 3. On this panel 17 is a magnet supporting rod 21 secured by bolts or pins 22 in the panel, the rod adjustably carrying the arms or straps 23 on the magnet block 25 of the movable stop, in the form of an electro-magnet 26 connected, Fig. 2, by suitable wires 27, as through an opening 28 in the panel, with any source of electricity, as the battery in the vehicle, not shown. The panel may be locked to the plate 1, Fig. 2, by bolts through the holes 30.

In operation, when the magnet 26 is energized by the operator through a switch, not shown, and the wires 27, the magnet attaches itself firmly to and becomes a permanent shoe stop on the drum 7, and the rotation of the wheel causes the magnet to contact with the free end of one of the shoes 10, and as the shoe is prevented from further rotating by one of the lugs 13 resting against an anchor pin 6, according to the direction in which the wheel is rotating, the shoe is forced outwardly under the clips 3 against the flange 9 of the drum and with sufficient force to cause the car to stop.

The magnet assembly includes a spring 31, suspended from the magnet block 25 beneath the lower edge of an insulating sheet 32 and bent upwardly to contact lightly against a buffer plate 33, between the magnet and the panel 17, the spring being sufficiently strong to prevent the magnet from swinging laterally against the panel 17 when the car is running and causing any clicking noise.

The brake, of course, is a double acting one, that is, it acts on the wheel moving in either direction, utilizing the moving wheel as a braking force, and may be used on either the front or rear wheels or both. It is particularly convenient for use on a trailer as the electrical circuit control wires 27 may be readily connected or disconnected between the automobile and the trailer by the use of a conventional electrical plug and socket.

Obviously my invention is not restricted to the present illustration and description thereof, but may be modified in many details within the scope of the claims.

I claim:

1. A brake for a vehicle having an axle and wheel thereon, the brake comprising a drum on the wheel, a shoe support on the axle for the brake shoe in cooperating relation with drum, the support having guides for the shoe and a removable panel therein, a shoe on and movable circumferentially of the support and within the drum, fixed stops on the support for the shoe, a movable stop member also on the support panel relatively operably positioned as to the shoes, and means operable from the vehicle to cause said movable stop member to become fixed on the drum between the shoe ends and act to force the shoe radially against the drum flange.

2. A brake for a vehicle having an axle and a wheel thereon, the brake comprising a shoe support on the axle with a removable panel, a drum opposite the support and on the wheel, shoe supporting and guiding clips in a curvilinear path on the support, shoes beneath said clips and between them and the drum, an electro-magnetic traveling stop member on the panel of the support and within the shoe path, and means operable from the vehicle to energize said electromagnet to cause it to anchor itself as a stop member on the drum in the path of a shoe and thereby cause said shoe to move radially against the drum to stop the vehicle.

3. A brake for a vehicle with an axle and wheel thereon, and comprising a brake drum on said wheel, a shoe support on the axle adjacent the drum with a removable panel, shoes on the support, guides on the support for the shoes and in circumferential arrangement, fixed stop members in like arrangement on the support, lugs on the shoes normally engaging said stops, a movable electro-magnetic stop member on the panel, a curved support for said stop member between said fixed stop members, and means operable from the vehicle to energize said movable stop member to cause it to become fixed on the drum between the fixed stops on the support and thereby cause one shoe to throw the second shoe against a fixed stop and force both shoes outwardly against the drum flange to stop the vehicle.

4. A brake for a vehicle having an axle and wheel, and comprising a drum on said wheel, a cooperating shoe support on the axle with a removable panel, shoes on the support, shoe guides on the support in radial arrangement, fixed stop members on the support in the path of the shoes, lugs on the shoes normally engaging said stops, an electro-magnetic stop member on the panel and relatively movable thereon and operable with either shoe, a support on the panel for the movable stop member and between said fixed stop members and between the shoes, means operable from the vehicle to energize said movable stop to cause it to anchor itself between the fixed stops and thereby cause one shoe to throw a second shoe against one fixed stop and both shoes outwardly against the drum flange to stop the vehicle, and means to draw the shoes radially inwardly when the movable stop is deenergized, and means to resiliently suspend said electro-magnetic stop member normally between the drum and the stop support to prevent rattling of the stop member.

THEODORE B. PATCH.